Feb. 1, 1927.  1,616,126
B. JACOBSON
PROTECTIVE MEANS FOR AUTOMOBILES
Filed Nov. 24, 1924  2 Sheets-Sheet 1
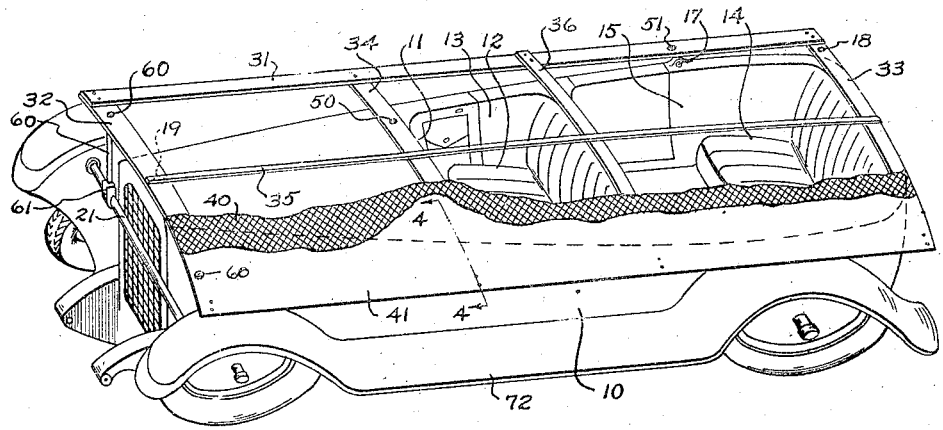
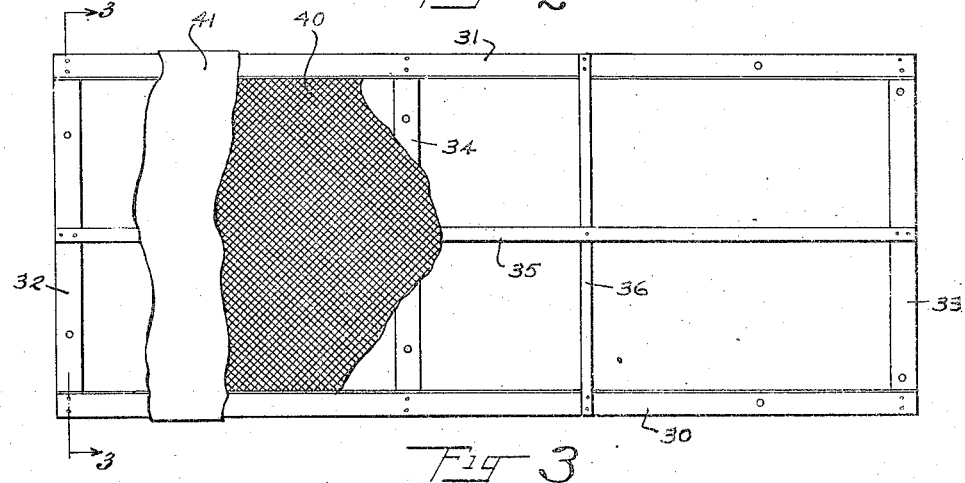
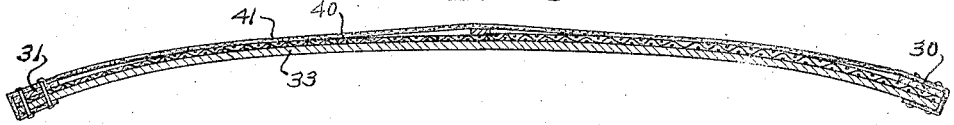
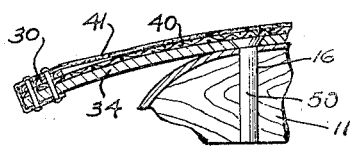
INVENTOR
Birger Jacobson
BY
George H. E. Tunnell
ATTORNEY Feb. 1, 1927. 1,616,126
B. JACOBSON
PROTECTIVE MEANS FOR AUTOMOBILES
Filed Nov. 24, 1924 2 Sheets-Sheet 2
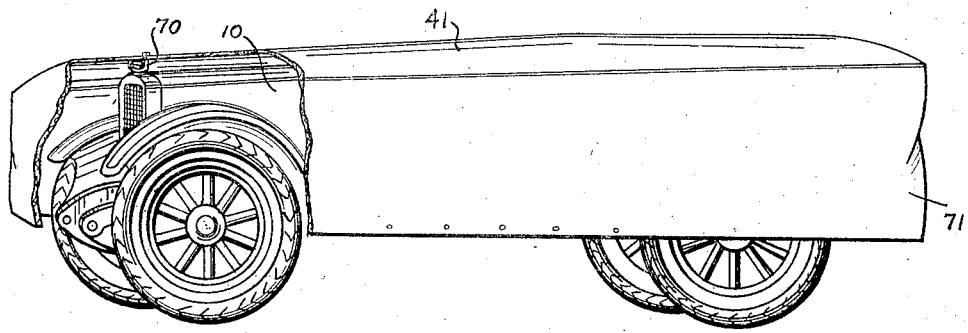
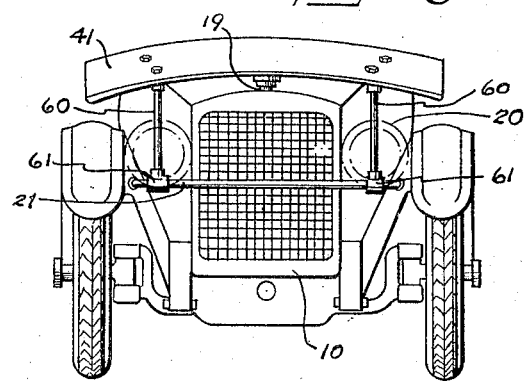
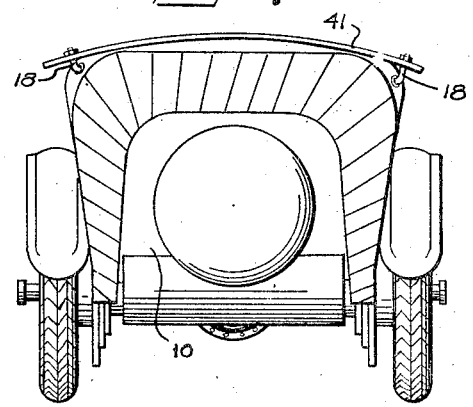 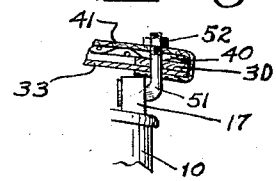
INVENTOR
Birger Jacobson
BY George H. C. Lundell
ATTORNEY Patented Feb. 1, 1927.

1,616,126

UNITED STATES PATENT OFFICE.

BIRGER JACOBSON, OF NEW YORK, N. Y., ASSIGNOR OF TWO-FIFTHS TO JAMES L. GILBERT, OF MOUNT VERNON, NEW YORK.

PROTECTIVE MEANS FOR AUTOMOBILES.

Application filed November 24, 1924. Serial No. 751,801.

This invention relates to improvements in automotive vehicles and protective means therefor.

Broadly stated, it is the object of the invention to provide protective means for automotive vehicles while they are in shipment. A feature of the invention relates to the provision of a protective structure particularly adapted to engage the body of an automotive vehicle when separable parts thereof are removed.

One object of the invention is to provide a frame coextensive with the body of the vehicle when the top and windshield are removed therefrom, adapted to be engaged with the usual fastening means, whereby such separable parts are attached to the vehicle in the normal operation thereof.

Another feature of the invention relates to the providing of a guard screen stretched over the frame to cover the exposed part of the vehicle and effectively prevent pilfering of tools, lamps or other valuable material therefrom.

Another feature of the invention relates to the provision of a sheet of flexible material for effectively preventing damage to the upholstery and the car during shipment.

Still another feature of the invention relates to the provision of a sheet of flexible material sufficiently large to enclose the sides of the vehicle, and thus offer a protection against undesirable damage to the finish of the vehicle.

Other features will appear from the following description taken in connection with the accompanying drawings, which show in a somewhat diagrammatic way, illustrative embodiments of the present invention, and in which Figure 1 is a perspective view of an automotive vehicle of the touring car type, having the top and windshield removed and having one form of my invention applied thereto;

Figure 2 is a plan view with parts broken away of the form of the invention illustrated in Figure 2;

Figure 3, is a section taken on the line 3—3 of Figure 2;

Figure 4, is a section taken on the line 4—4 of Figure 1;

Figure 5 is a perspective view of a modified form of the invention with parts broken away;

Figure 6 is a front view of an automotive vehicle showing a modified form of the invention applied thereto;

Figure 7 is a rear view of an automotive vehicle showing the protective means of my invention applied thereto;

Figure 8, is a detailed view of one of the supports mounted on the vehicle.

It is understood that this invention has reference particularly to automotive vehicles of the open body type or so called touring car and roadster models. Such models are usually constructed with the usual vehicle body comprising upholstered seats for the use of the passengers, and with a folding top having bows and braces, whereby the top may be extended for the protection of the passengers from the weather during the operation of the car. It is understood that such tops may be readily folded down when weather conditions permit. Such vehicle bodies also usually include windshields of conventional type, positioned proximate to, but over the dash of the vehicle, and in front of the passengers. The headlights or lamps of the vehicle are also readily separable from the car fixtures upon which they are mounted. The radiator cap is also removable. It is understood that these elements of the vehicle are readily separated from the vehicle body and the present invention contemplates such separation during the shipment of the vehicle.

Referring to Figure 1 there is shown an automotive vehicle of the open model type dismantled as has been described. It is understood that the vehicle comprises a body 10, having a dash 11 and front seat 12, forming collectively a front compartment 13 between the dash 11 and the front seat 12, and having a rear seat 14, forming a rear compartment 15 between the front seat 12 and the rear seat 14. It will be appreciated that the removal of the windshield exposes a pair of sockets such as 16, which are provided for the standards of the windshield, and that one of these sockets is located on each side of the car in proximity to the dash 11. Similarly there is provided for the support of the top a pair of brackets, such as 17, one on each side of the car and adjacent the rear compartment 15. As illustrated in detail in Figure 7, each of the said brackets is integrally mounted on a portion of the body 10 of the vehicle. Similarly, there is provided for the support of the folding top, a pair of brackets such as 18, each mounted on the side of the body near the rear end thereof. During the shipment of a car, the usual radiator cap (not shown) and the head lights are removed and may be placed in one of the compartments 13 or 15, or may be shipped separately as desired. The removal of the radiator cap exposes the opening or filler neck 19 of the radiator. The removal of the headlights, such as the headlight 20, relieves the respective fixture 21, upon which the headlight is mounted during the normal operation of the car. It will thus be seen that the vehicle when prepared for a shipment as has been described, provides a number of points of attachment for an accessory in the form of protective means.

Referring now in detail to Figure 2, the protective shield of my invention may include a pair of spaced frame members such as 30, 31, substantially coextensive with the upper lateral edges of the vehicle. The said frame members 30, 31 are preferably constructed of a substantially rigid material such as wood or the like. The frame further consists of a pair of spaced cross members 32, 33, joining the lateral frame members 30, 31 at the ends of the frame members, and an additional cross member 34 is provided joining the intermediate portions of the lateral frame members 30, 31. A reinforcing member 35, extending along the longitudinal axis of the body of the vehicle is provided for imparting strength and rigidity to the frame structure. For automotive vehicles of considerable length, there may be provided an additional cross member 36, as indicated in Figures 1 and 2, but it is understood that this feature may be omitted without departing from the spirit of the invention. The cross members 32, 33, 34 and 36 and the reinforcing member 35 are preferably formed of a substantially rigid material, such as iron or the like. The several members forming the frame are joined together as shown in Figure 2, by means of suitable bolts or the like, as clearly indicated in Figure 4.

Stretched over the frame thus formed, is a guard screen 40 formed of metal wire interlaced and fastened to the lateral members by being nailed thereto. As indicated in Figure 3, the arrangement is such that the fastening devices or nails provided for the purpose of securing the guard screen 40 to the lateral members 30, 31 respectively, extend into the lateral members in an upward direction, so that such fastening means cannot be removed while the protective means is in place upon the vehicle body. For protecting the interior of the body from dust, dirt, etc., there is provided a sheet 41 of flexible material, such as canvas or the like, and fastened to the lateral frame members 30, 31 by being nailed or otherwise secured thereto. The cross member 34 is provided with a pair of depending fingers or dowels such as 50 illustrated in Figure 4 and the cross member 34 and dowels 50 thereof, are so positioned with respect to the vehicle body that each dowel engages one of the sockets 16 in the vehicle body 10. Each lateral member 30, 31 is provided with engaging means comprising an element 51 formed to engage the respective brackets 17 of the vehicle body 10, and hold down bolt 52, or the like is provided for securing the protective means in fixed position relative to the body. The rear portion of each lateral frame member 30, 31 is provided with means to secure the protective means in place, upon the rear bracket 18 similar to that described with respect to the bracket 17.

The forward part of the protector is preferably arranged to engage the mounting of the headlights as indicated in Figure 6. The protector is provided with a pair of depending supporting elements on either side of the forward end thereof each comprising an arm 60 secured to the forward cross member 32 as by being bolted thereto and having at its lower end a clamp 61 arranged to engage the headlights support 21.

In the modified embodiment shown in Figure 5, the forward end of the protector is supported by means of a member 70 arranged to engage the filler opening of the radiator of the vehicle. A feature of the modified embodiment shown in Figure 5 is that the canvas covering 41 is extended downwardly as at 71 so as to protect the sides of the vehicle body. The lateral edges 71 are preferably fastened for at least a portion of their length to the usual running board 72 of the vehicle body 10.

Thus it will be seen that I have provided a simple and efficient protector structure to protect the vehicle body against the elements during shipments. By means of the present invention, expensive casings and boxes, for such cars are eliminated, thus reducing greatly the cubic measurement of the space occupied by the vehicle in shipment and reducing proportionately the freight charges and the costs of shipping such cars by steamboat. An important feature of the invention is that an inspection of the type of vehicle can readily be made by customs officials and others without having to open up any casing or the like, and considerable time in shipping to foreign countries can thus be saved. The protector devices of my invention can be readily removed when the vehicle is delivered to the consignee and the car can be placed in service in a minimum length of time.

Thus the costs of shipping automotive vehicles in the export trade, are minimized, and convenience of handling greatly improved.

While I have shown and described preferred embodiments of my invention, I wish it distinctly understood that the scope of the invention is not to be limited thereby, reference being had to the appended claims for that purpose.

Having thus described my invention, I claim:

1. A shipping protector for an automotive vehicle, comprising a rigid shield extending from the radiator to the rear end of the vehicle and extending over the upper lateral edges of the vehicle, said shield having means engaging portions of the vehicle body to secure the shield thereto, in place of removable portions of the vehicle.

2. A shipping protector for an automotive vehicle of the type having a separable windshield and top, comprising a rigid shield extending from the radiator to the rear end of the vehicle and extending over the upper lateral edges of the vehicle, said shield being arranged to replace the windshield and top of the vehicle and having means for engaging portions of the vehicle normally engaged by the top and windshield.

3. The combination with an automobile having means to secure a windshield thereto, of a rigid shipment shield adapted to be secured to said automobile in place of the windshield, said protective shield extending from the radiator to the rear end of the vehicle and extending over the upper lateral edges of the automobile, and secured to said windshield securing means.

Signed at New York, in the county of New York and State of New York November, A. D. 1924.

BIRGER JACOBSON.